3-153 SR
25/85 XR RE 31,923

United States Patent [19]

Justus et al.

[11] E Patent Number: Re. 31,923

[45] Reissued Date of Patent: Jun. 25, 1985

[54] EXTENDED NIP PRESS

[75] Inventors: Edgar J. Justus; Arnold J. Roerig, both of Beloit, Wis.

[73] Assignee: Beloit Corporation, Beloit, Wis.

[21] Appl. No.: 519,369

[22] Filed: Aug. 1, 1983

Related U.S. Patent Documents

Reissue of:

[64] Patent No.: 4,287,021
Issued: Sep. 1, 1981
Appl. No.: 69,869
Filed: Aug. 27, 1979

U.S. Applications:

[63] Continuation of Ser. No. 403,122, Jul. 29, 1982, abandoned.

[51] Int. Cl.[3] ..... D21F 3/06; D21F 3/08

[52] U.S. Cl. ..... 162/358; 100/93 RP; 100/153; 162/205

[58] Field of Search ..... 162/205, 358, 360, 361, 162/305; 100/93 RP, 121, 151, 152, 153; 34/95.3, 123

[56] References Cited

U.S. PATENT DOCUMENTS

| | | | |
|---|---|---|---|
| Re. 30,268 | 5/1980 | Justus | 100/153 X |
| 3,283,097 | 1/1974 | Justus | 162/358 |
| 3,293,121 | 12/1966 | Martin | 162/358 |
| 3,386,149 | 6/1968 | Robertson | 29/116 |
| 3,808,096 | 4/1974 | Busker | 162/358 |
| 3,853,698 | 12/1974 | Mohr | 162/358 |

FOREIGN PATENT DOCUMENTS

| | | | |
|---|---|---|---|
| 0728918 | 3/1966 | Canada | 162/358 |

*Primary Examiner*—Steve Alvo
*Attorney, Agent, or Firm*—Hill, Van Santen, Steadman & Simpson

[57] ABSTRACT

An extended nip press for removing water from a traveling web in a paper machine including a press roll with an elongate shoe having a concave surface facing the roll and forming an extended nip therebetween with an endless belt trained over the shoe for passing through the nip and first and second belts passing through the nip with the belt supported by a plurality of guide rolls or by an annular shell having continuous smooth outer surface extending from the outgoing side of the nip back to the oncoming side of the nip with a beam within the shell and a uniform fluid support for the shoe supported on the beam.

8 Claims, 3 Drawing Figures

EXTENDED NIP PRESS

Matter enclosed in heavy brackets [ ] appears in the original patent but forms no part of this reissue specification; matter printed in italics indicates the additions made by reissue.

*This is a continuation of Ser. No. 403,122 filed July 29, 1982, now abandoned; Reissue of 4,287,021, issued Sept. 9, 1981.*

BACKGROUND OF THE INVENTION

The present invention relates to improvements in presses for mechanically pressing water from a traveling web in a paper machine and more particularly to a press of the type knwon as an extended nip press wherein the length of a single nip in the machine direction extends substantially longer than a nip of a conventional type formed between two mating rolls.

Extended nip presses of this type have been formed in various arrangements with one type of arrangement employing a roll as one of the members of the press with a shoe supporting an endless traveling belt forming the other member of the press. A structure of this type is shown in the Justus U.S. Pat. No. 3,783,097. Difficulties have been encountered in controlling and guiding the belt in this type of arrangement and the present invention contemplates an arrangement whereby problems encountered in structures heretofore available are avoided.

Accordingly, an object of the present invention is to provide an improved extended nip press of the type described with an arrangement for supporting and guiding the belt whereby the path of travel of the belt remains under control without deviation at high speeds required for pressing a traveling web in a paper making machine.

A further object of the invention is to provide an improved belt and support therefor in an extended nip press of the type described. A further object of the invention is to provide an extended nip press using an endless belt running through the nip wherein a structure is provided that attains longer belt life and requires the belt to run through a less tortuous path than with structures heretofore available and wherein the belt can operate at zero tension.

Other objects, advantages and features, as well as equivalent methods and structures which are intended to be covered herein, will become more apparent with the teaching of the principles of the invention in connection with the disclosure of the preferred embodiment thereof in the specification, claims and drawings, in which:

DRAWINGS

DESCRIPTION

Figure 1:
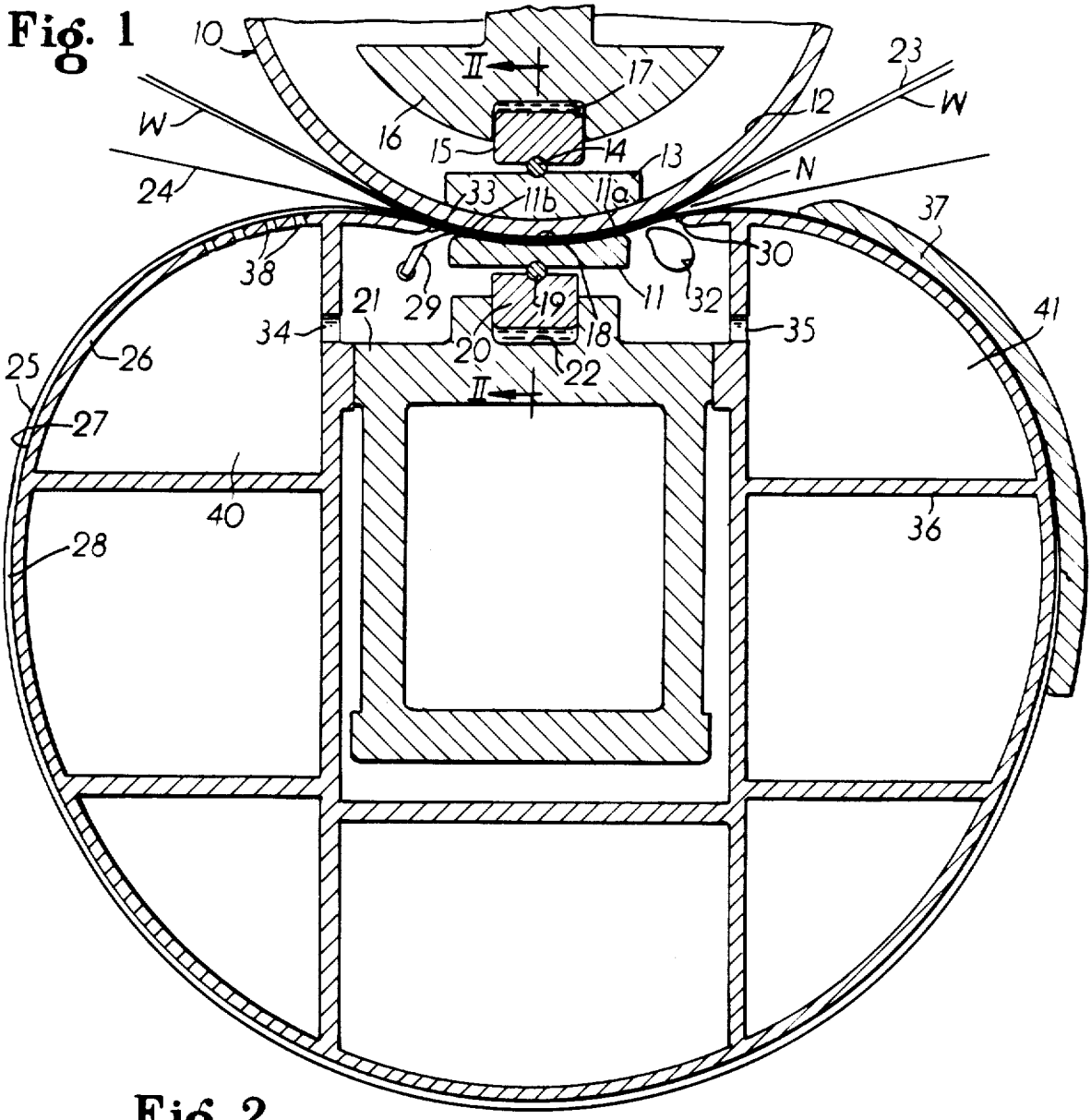
FIG. 1 is a vertical sectional view illustrating somewhat schematically an extended press constructed and operating in accordance with the principles of the present invention.
Figure 2:
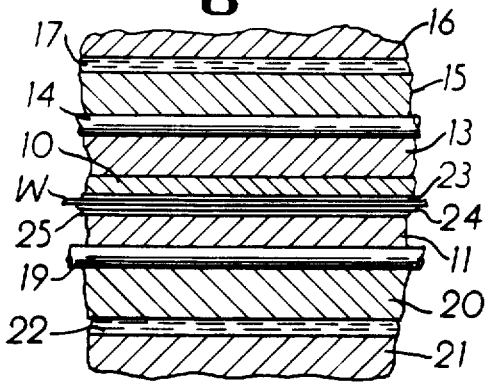
FIG. 2 is a sectional view taken substantially along line II—II of FIG. 1 with the section being fragmentary.

As shown in FIGS. 1 and 2, the press mechanism includes a roll 10 which is preferably in the form of a hollow roll shell supported therein by a sliding slipper bearing or shoe 13.

An opposing press shoe 11 having a concave upper surface 18 to conform to the outer surface of the roll shell forms a nip N therewith.

The hollow roll shell has the limber sliding shoe 13 therein which is preferably of one piece and extends for the length of the roll shell, although it may be divided into adjacent sections. The shoe 13 is pivotally supported on a roll pin 14 which is supported on a piston 15 positioned in an oil pressure channel 17 in a beam extending through the roll shell. The channel is pressurized beneath the shoe by suitable oil supply means, not shown, and the piston 15 supports the limber shoe 13 with a uniform pressure throughout its length so as to obtain uniform pressure throughout the length of the nip N.

Passing through the nip N is a first upper felt 23 and a second lower felt 24, and the web W is carried between the felts through the nip, may enter the nip carried on the surface of one of the felts. The nip will extend essentially for the length of the shoe 11 which will subject the web to a pressing pressure from the time it enters the oncoming side of the nip at 11a until it leaves on the offrunning side of the nip 11b. The shoe has a relieved lead-in or nose portion so as to receive a film of lubricant provided by a lubricant supply nozzle 32 to lubricate the upper surface of the shoe and permit continuous sliding movement of an endless circular belt 25 along the shoe. The belt is formed of a heavy rubber of reinforced rubber.

As a feature of the present invention, the belt is run, not under tension, but free of tension and is guided in a natural circular path to leave and re-enter the nip. To define a natural circular path, a hollow tube or guide shell 26 is provided within the belt extending to support the belt and has an outer smooth surface 27. The surface extends from a circumferential location 33 immediately following the offrunning side of the nip to a location 30 immediately in advance of the oncoming side of the nip. The smooth outer surface of the guide shell 26 is preferably provided with oil relief holes 38 on the offrunning side to permit the drainage of lubricant from beneath the surface of the belt. The oil which passes through the openings 38 is drawn off from a compartment 40 beneath the passages.

The shell which supports the belt is of a diameter less than the belt so as to provide a free space 28 between the belt and the outer smooth surface of the shell so that the belt travels under zero tension. Actually, preferably there is a small gap between the circular guide shell 26 and the belt.

Within the belt is a supporting framework 36 for the shell and the framework provides the oil return chamber 40 on the off-running side and an oil return chamber 41 on the oncoming side. Oil drain openings such as 34 and 35 are provided from the compartment between the shoe to accommodate the escape of oil into the oil return chambers 40 and 41.

Within the framework 36 and the looped belt 25 is a beam 21 extending parallel to the nip. This beam is provided with a channel 22 with a piston 20 therein. The piston supports the shoe 18 on a roll pin 19 and the channel 22 beneath the piston is supplied with a pressurized oil similar to the channel 17 and at a pressure essentially equal thereto.

On the offrunning side of the nip a doctor 29 aids in separating the oil from the inner surface of the belt.

Figure 3:
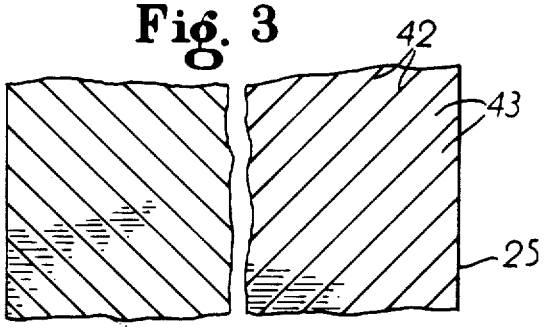
FIG. 3 is a view of a portion of the inside of the belt illustrating the oil transfer grooves therein.

For aiding in lubricating the belt and preventing the escape of oil axially outwardly of the belt, the belt is provided with grooves on its inner surface as shown by the grooves 42 in the surface 43 of the belt in FIG. 3. This tends to work the lubricant toward the center of the belt, the grooves are relatively shallow as to not weaken the belt, and preferably are in a spiral pattern with the spiral extending toward the center relative to the direction of travel of the inner surface of the belt.

A belt cover 37 may be positioned outside of the belt to prevent it from fluttering against its supporting surface and aid in guiding it. In addition to the elongate belt cover shown at 37, axially extending rods may be provided adjacent the outer belt surface to aid it in its stable travel.

In operation, the hydraulic loading means in the channel 17 for the shoe supporting the roll shell 10 and the channel 22 beneath the piston supporting the shoe 11 are similarly pressurized and the web W travels through the nip between the felts 23 and 24. The web enters the nip at 11a and leaves at 11b for an extended travel under the pressure imposed within the nip which pressure is controlled by the pressure beneath the pistons in the chamber 17 and 22. The water is expressed into the felt and suitable felt drying means are provided for the looped felts 23 and 24. In some instances, the outer surface of the roll 10 may be grooved to aid in the receipt of water by the felt 23 and the outer surface of the belt 25 may similarly be grooved to aid in the passage of the water from the web into the felt 24.

The improved stable travel of the belt improves the quality of the paper web being pressed in the nip. With structures heretofore used, improper alignment of the belt can affect the tension in the nip or create stresses on the felt and the web so that uniform pressing is disturbed. Further, by prolonging the working life of the belt, its satisfactory operation is prolonged and often failure of the belt could begin without being noticed by the paper machine operator, and defects in the web occur before the machine could be shut down and the belt replaced. The belt is subjected to very hard wear and very high stresses by continual travel through the press and the relaxation of the belt to its free form as it travels around the circular guide in the present form of the invention, substantially improves performance and operation.

We claim as our invention:

1. An extended nip press for removing water from a traveling web in a paper machine comprising in combination:

a press roll;

an elongate shoe forming a press nip with said press roll and having a concave surface to conform to said roll so that the press nip is formed elongate in the direction of web travel through the nip;

[a first endless felt trained over said roll to travel through said nip;]

an endless belt trained over said shoe for passing through said nip;

[a second endless felt trained over said belt to travel through said nip with the web passing through the nip between said felts;]

*means for receiving water pressed from the web in said press nip;* means for providing a lubricant between said shoe and belt;

and guide means within said belt guiding and supporting the belt on the shoe;

said guide means having an outer smooth curved surface of a circumference slightly smaller than the belt to provide a continual smooth sliding surface for the belt so that the belt [operates under zero tension and] is self-aligning wherein the belt is guided [substantially] along *substantially* the entire circumference of the guide means.

2. An extended nip press for removing water from a traveling web in a paper machine constructed in accordance with claim 1:

wherein said press roll is a hollow roll shell with a beam extended therethrough;

a sliding slipper bearing shoe means within the roll shell positioned opposite the nip for supporting the roll shell;

and a fluid pressure support between the beam and shoe applying a uniform supporting force to the shoe along the length of the roll.

3. An extended nip press for removing water from a traveling web in a paper machine constructed in accordance with claim 1.

including a beam extending along within said belt parallel to the nip;

and a fluid pressure support between the beam and said shoe applying a uniform supporting force to the shoe along its length opposite the nip.

4. An extended nip press for removing water from a traveling web in a paper machine constructed in accordance with claim 1:

wherein said surface is arranged to provide a space therein with a beam extending through said space and supporting said shoe.

5. An extended nip press for removing water from a traveling web in a paper machine constructed in accordance with claim 1:

including a plurality of openings in said outer smooth surface located on the outgoing side of the nip.

6. An extended nip press for removing water from a traveling web in a paper machine constructed in accordance with claim 1:

wherein said belt guide means has a diameter slightly less than the diameter of said belt so as to accommodate a radial space between the inner surface of the belt and the outer surface of the guide means.

7. In an extended nip press for removing water from a traveling web in a paper machine constructed in accordance with claim 1:

including means defining grooves on the inside of the belt with the grooves spiralling toward the center of the belt to move lubricant axially inwardly along the belt.

*8. An extended nip press for removing water from water from a traveling web in a paper machine constructed in accordance with claim 1:*

*wherein the belt operates under zero tension.*

* * * * *